United States Patent
Busch

(10) Patent No.: US 6,223,102 B1
(45) Date of Patent: Apr. 24, 2001

(54) METHOD AND DEVICE FOR ALIGNING THE SHAFT OF A ROTATING MACHINE

(75) Inventor: Dieter Busch, Ismaning (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 08/973,044

(22) PCT Filed: Mar. 27, 1996

(86) PCT No.: PCT/EP96/01337

§ 371 Date: Mar. 3, 1998

§ 102(e) Date: Mar. 3, 1998

(87) PCT Pub. No.: WO97/36146

PCT Pub. Date: Oct. 2, 1997

(51) Int. Cl.$^7$ ........................... G01B 21/24; G01B 11/27; G01D 7/12; G06F 3/16

(52) U.S. Cl. ..................... 700/279; 700/54; 700/66; 700/280; 700/64; 33/645; 33/661; 704/226

(58) Field of Search ................. 700/54–66, 249, 700/250, 277, 278, 279, 280; 33/612, 645, 661; 704/226, 235, 260

(56) References Cited

U.S. PATENT DOCUMENTS

| | | | |
|---|---|---|---|
| 4,709,485 | * 12/1987 | Bowman | 33/228 |
| 5,020,108 | * 5/1991 | Wason | 381/48 |
| 5,026,998 | * 6/1991 | Holzl | 250/561 |
| 5,056,237 | * 10/1991 | Saunders | 33/645 |
| 5,077,905 | * 1/1992 | Murray, Jr. | 33/412 |
| 5,263,261 | * 11/1993 | Piety et al. | 33/345 |
| 5,621,655 | * 4/1997 | Nower et al. | 700/279 |
| 5,805,464 | * 9/1998 | Cameron et al. | 700/279 |

* cited by examiner

Primary Examiner—Paul P. Gordon
Assistant Examiner—Ramesh Patel
(74) Attorney, Agent, or Firm—Kirkpatrick & Lockhart LLP

(57) ABSTRACT

A method and an apparatus are specified for alignment of the shaft W1 of a rotating machine M1 in a predetermined nominal position by moving the machine M1 on the base, as well as an apparatus for carrying out the method. The instantaneous position of the shaft W1 is detected in a known manner by a sensor device 7, which provides electrical position signals corresponding to the difference between the instantaneous position of the shaft W1 and the shaft nominal position. These position signals, the known relative position of the mounting points 6 of the machine M1 on the base with respect to the predetermined reference points on this base, and other geometric measurement data are used by a computer to calculate correction values for position corrections to be made at the individual mounting points 6 of the machine M1, and these correction values are brought to the attention of the alignment technician 4, for the magnitude and direction for each mounting point 6. According to the invention, the current correction values which, until now, have been indicated only visually according to the prior art, are transmitted acoustically, for the individual mounting points 6, to the alignment technician 4. The alignment technician 4 can thus pay his full attention to the position corrections to be carried out at the mounting points (6).

18 Claims, 3 Drawing Sheets

METHOD AND DEVICE FOR ALIGNING THE SHAFT OF A ROTATING MACHINE

Figure 1:
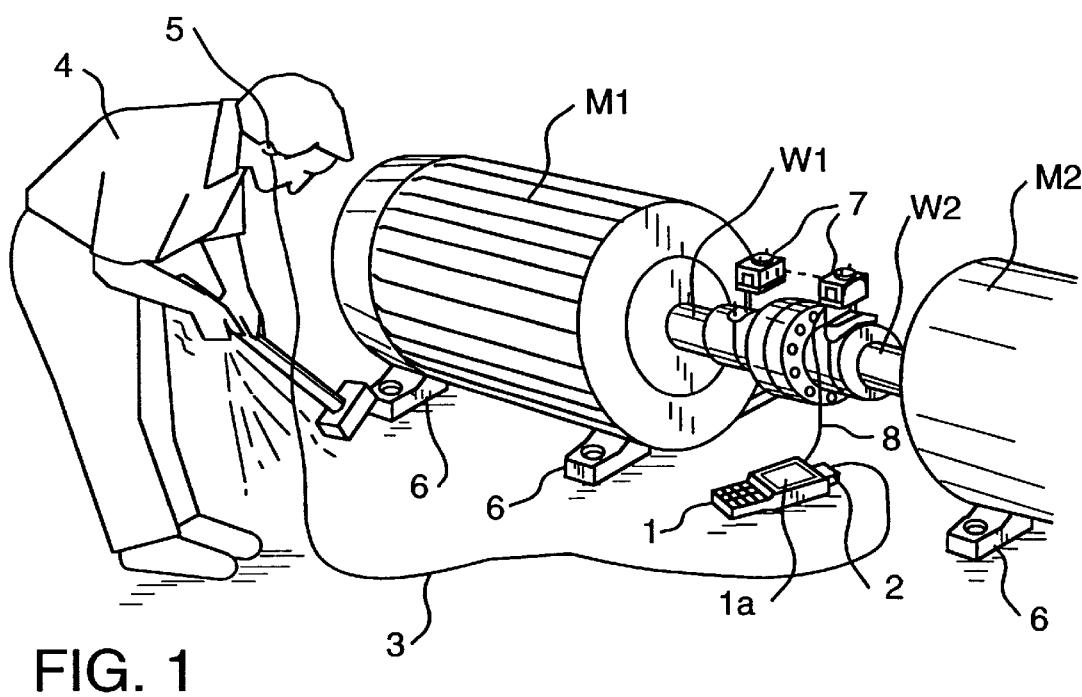

The invention relates to a method for alignment of the shaft of a rotating machine, which is supported at predetermined mounting points on a base, in a predetermined three-dimensional nominal position by moving the machine on the base,
- a) the instantaneous position of the shaft with respect to the nominal position being detected by means of a sensor device which provides electrical position signals corresponding to the difference between the instantaneous position of the shaft and the shaft nominal position,
- b) these position signals, the known position of the mounting points with respect to the predetermined reference points on the base and other geometric machine data and/or geometric measurement data related to the base being used to calculate, by means of computer correction values for position corrections to be made at each of the individual mounting points in order to achieve the shaft nominal position, and
- c) the magnitude and direction of the correction values for each mounting point being brought to the attention of the alignment technician who will make the position corrections.

Methods of this type are known, for example, from EP-B1-0 145 745.

The shafts of two rotating machines are often connected to one another by means of an elastic coupling, whose task is to absorb any mutual offset between the two machine shafts (parallel offset, angular offset) which should, in the ideal case, be aligned exactly in line.

High-speed machines and/or the transmission of ever greater torques demand that, even when the machine group is being installed, the two shafts be aligned to a very large extent in order to load the coupling with only a small amount of work, and this alignment is carried out in accordance with methods of this generic type. The measured values which are obtained by means of the sensor device and are entered in the computer are processed by the computer on the basis of the geometric dimensions (likewise entered in it) for the machines to be aligned, in particular the mutual position of the mounting points of the machines on the base, to give correction values for correcting the positions of said mounting points, in the form of statements and/or proposals relating to the correction measures to be carried out, an indication being given for each individual mounting point of the machine to be aligned as to the direction and magnitude of its movement in order to reach the in-line state.

Any necessary vertical correction of a conventional machine (for example a pump, motor, generator) is generally carried out by means of supporting plates, so-called shims, while any required horizontal movement of the machine is, as a rule, carried out by knocking the machine feet with a sledgehammer, once the securing bolts have been loosened.

The better way of using an adjusting screw or bolt with a mating fitting, with whose aid the machine to be aligned could be moved slowly and exactly, is generally not feasible since such adjusting screws or bolts are not provided on the majority of machines that are already installed or are to be installed in the future.

When carrying out the known methods of this generic type, the correction values have until now been indicated only on a computer-controlled display. For hammer correction, this resulted in the problem that the machine alignment technician had to look, at the same time, both at the indication on the display and at the respective machine foot to be hit by hammer blows. The display indication indicates to him the number of millimeters or tenths of a millimeter by which he still has to move the machine foot by knocking it and, on the other hand, he has to be careful not to damage the machine foot by an incorrectly applied blow. Even a single inaccurately applied blow with a heavy sledgehammer can destroy the machine housing casting.

The invention is based on the object of making it easier for the machine alignment technician to carry out the alignment work in a manner which allows him to pay his full attention to the blows to be applied by him to the machine foot, and thus to avoid damage to this foot.

The abovementioned object is achieved by the features of patent claim 1.

On the basis of the method according to the invention, the machine alignment technician receives the instructions required to carry out the correction of the machine position acoustically, so that he can pay his full attention to shifting the machine foot. As claimed in claim 4, the acoustic instruction can be transmitted as a tone signal produced by means of an electronically controlled tone generator or else, as claimed in claim 8, as a spoken instruction to the machine alignment technician, produced by means of a voice memory module or a voice synthesis unit.

The dependent claims 2, 3, 5–7 and 9–11 relate to further preferred refinements of the method according to the invention, which also include acoustic transmission of details from computer-controlled operator guidance for operation of the computer and for handling of the sensor device. The latter is advantageous irrespective of the acoustic transmission of correction values, in particular if only simple computer-controlled LCD indications with fixed symbols are available for operator guidance, which do not allow the visual user interface to be coped with as completely as would be desirable. This is possible only with so-called pixel displays which, however, together with the electronic control system required for them, are expensive and, in addition, can be used only within a rather limited temperature range.

The invention also relates to an apparatus for carrying out the method according to the invention. This apparatus is equipped in a known manner with
- a) a sensor device, which is mounted on the shaft to be aligned, for detecting the instantaneous position of the shaft with respect to the nominal position, the sensor device providing electrical position signals corresponding to the difference between the instantaneous shaft position and the shaft nominal position,
- b) an electronic computer which uses the position signals supplied to it by the sensor device and geometric measurement data which are entered in it and are characteristic, inter alia, of the position of the mounting points of the machine with respect to mounting points on the base to calculate correction values for the position corrections to be made in each case at the individual mounting points in order to achieve the shaft nominal position, and
- c) a device which informs the alignment technician carrying out the position corrections of the magnitude and direction of the calculated correction values for each mounting point, and, according to the invention, it is distinguished by a device which is controlled by the computer for producing acoustic signals which are characteristic at least of the magnitude of the calculated correction values.

The dependent claims 13 to 16 relate to preferred refinements of the subject matter of patent claim 12.

Figure 2:
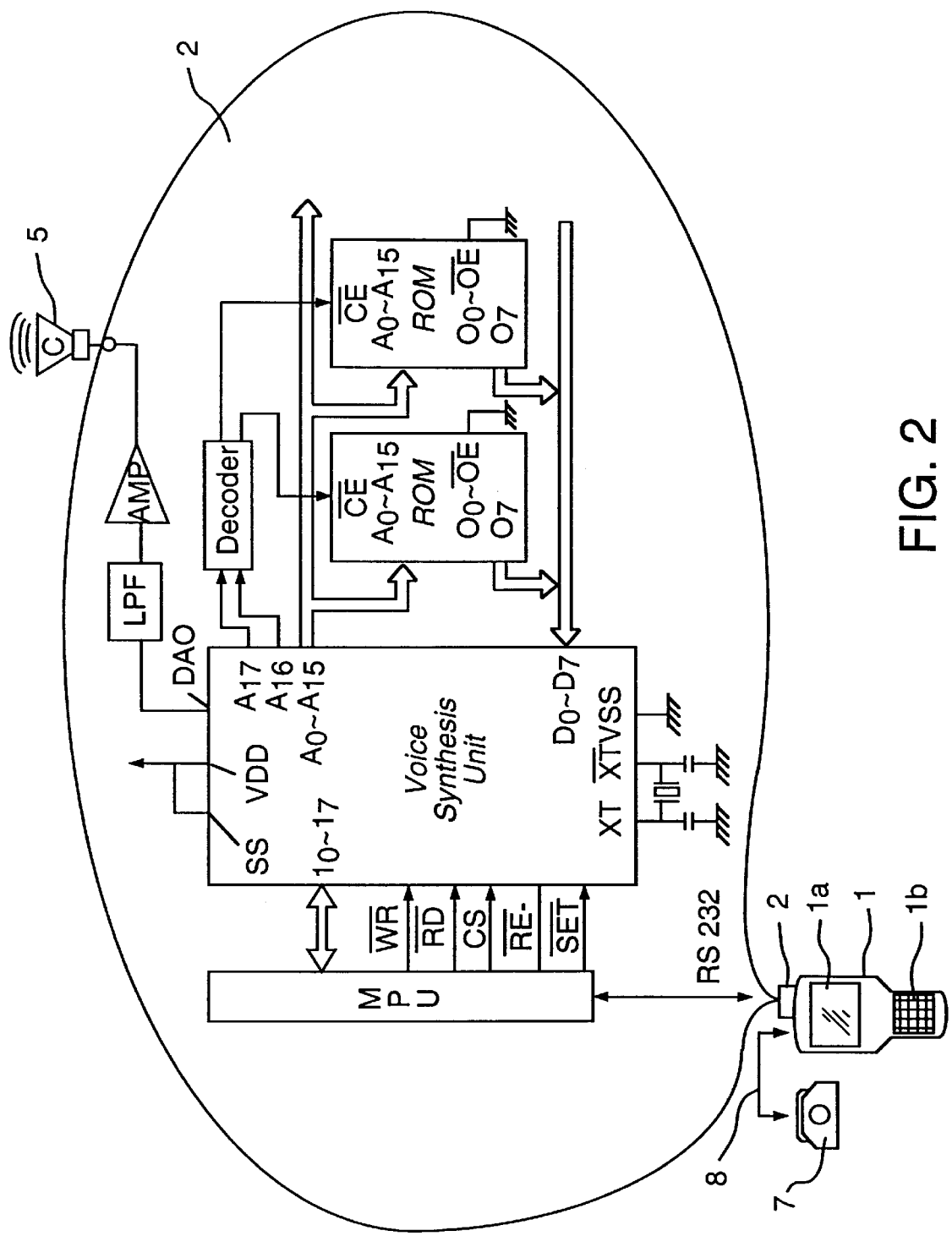
Figure 3:
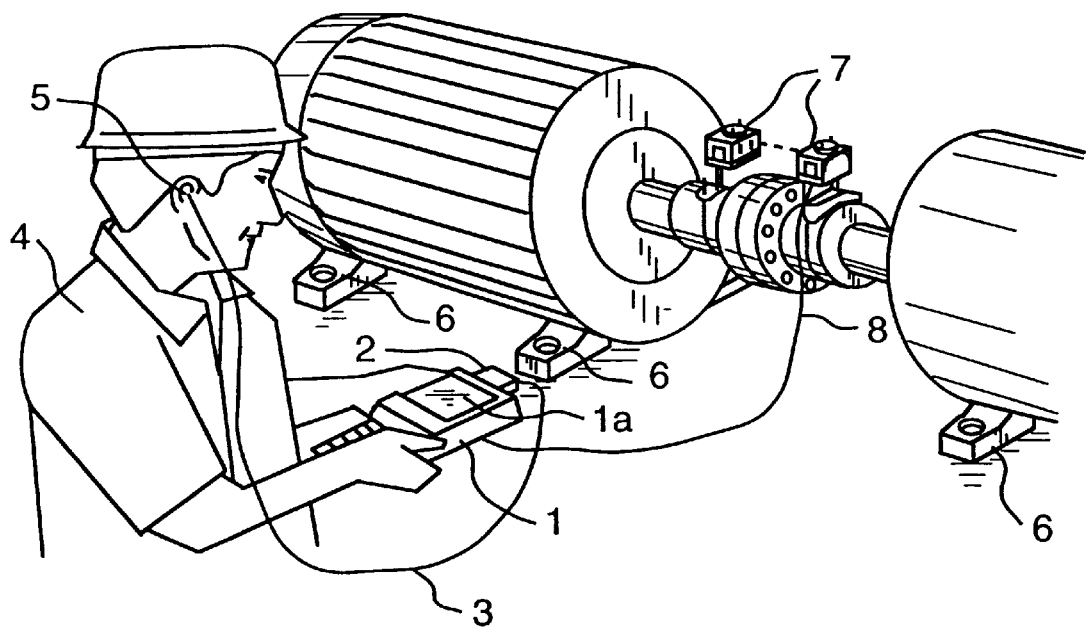

The invention will be explained in more detail in the following text using exemplary embodiments and with reference to the drawing, in which:

FIG. 1 shows a perspective, schematic illustration of a machine alignment technician aligning the machine by applying blows to the machine feet, FIG. 2 shows a schematic illustration of an exemplary embodiment of an announcement unit that is suitable for carrying out the method according to the invention, and FIG. 3 shows an operator handling the sensor device by means of a computer which has only a simple LCD display for visual indication of statements for operator guidance.

With regard to the means for obtaining the current measurement and correction values for achieving the desired alignment state of the shafts W1 and W2 by varying the mutual position of the machines M1 and M2, the alignment systems used in the exemplary embodiments comprise the known, so-called Optalign system according to EP-B1-0 145 745. The calculated correction values in this known system have until now been indicated only purely visually by means of a computer-controlled display 1a on a control unit 1 which, normally, also contains the alignment computer (main processor).

The system illustrated schematically in the drawing differs from this known system in that, apart from its visual indication of the correction measures to be carried out, acoustic transmission of these correction values is also provided by means of a computer-controlled display 1a.

In the case of the illustrated exemplary embodiment, the computer may also be fitted in a known manner into a separate control unit 1, which the operator can hold in his hand.

The correction values are produced continuously, for example, by means of a tone generator (not illustrated) which is controlled by the computer in the control unit 1, is preferably also fitted in the latter and is in the form of a coded tone, or as a spoken instruction by means of a computer-controlled voice memory module or, as can be seen in particular from FIG. 2, by means of an announcement device 2 which is controlled by the computer in the control unit 1 and has a voice synthesizer module as the voice synthesis unit VSU, and are transmitted via a cable 3 to a head- set or earpiece 5 worn by the machine alignment technician 4, so that the machine alignment technician 4 can pay his full attention to the movement of the machine feet 6 in the required manner.

The measured values are produced by the sensor unit 7 in a known manner and are supplied to the alignment technician's computer which is located in the control unit 1 and this can be done, as illustrated, via a cable 8 or else without wires.

Instead of accommodating the conventional alignment computer in a separate control unit 1, a physically small computer could also be integrated in the sensor unit 7, together with the announcement device 2.

In the illustrated exemplary embodiment, the cable 3 is provided for the transmission of the acoustic signals to the headset or earpiece 5, but, in principle, transmission without wires, for example a radio link or IR link, could also be used for this purpose.

The acoustic signal supplied to the machine alignment technician 4 may be a tone whose level, that is to say frequency, is controlled as a function of the magnitude of the correction value still required at the moment, a further tone, but at a fixed frequency, preferably being transmitted with this tone, whose level corresponds to the correction value of zero so that, in this case, a double tone can be heard as long as there is an alignment error, and this double tone merges into a single tone as soon as the alignment state is reached.

The tone which describes the magnitude and direction of the correction to be carried out may also be a pulsed tone, whose duty ratio and/or pulse frequency corresponds to the magnitude of the correction to be made in a predetermined direction at the respectively predetermined mounting point.

A further particularly convenient option for acoustic transmission of the correction values to the machine alignment technician 4 is to produce voice information about the magnitude and direction of the correction value still required at the moment, together with identification of the relevant mounting point with the aid of a voice memory module or, as can be seen in FIG. 2, by means of an announcement device 2 which contains a voice synthesis unit VSU and, controlled by a computer, produces, for example, the announcement "Move left rear foot 1.25 mm . . . another 0.9 . . . 0.7 . . . 0.4 . . . 0.1 . . . stop . . . 0.1 back . . . stop, . . . now move front foot 2.15 mm . . . " etc.

Even when the alignment process is not actually being carried out, an acoustic output of the instructions may be expedient, as can be seen from FIG. 2, if only a simple LCD display 1a with fixed symbols is available for optical display. For example, the statement "Secure the quick-release apparatus for the sensor unit with the aid of the chain on the driveshaft as close as possible to the coupling . . . " cannot be displayed graphically and visually on such a display, but a voice memory module or an announcement device equipped with a voice synthesis unit allows this to be done under computer control.

A pixel display with the required associated electronic control system is, in contrast, in general considerably more expensive and can also be used only within a limited temperature range, with a relatively low maximum permissible temperature, and it is often not possible to guarantee this in the environmental conditions which frequently occur at the point of use of machines to be aligned.

FIG. 2 shows a schematic illustration of an exemplary embodiment of an announcement unit 2 which is suitable for carrying out the method according to the invention and is controlled by the computer in the control unit 1. In the exemplary embodiment according to the drawing, the announcement unit 2 is plugged onto the control unit 1, but it could also be connected to it via a cable, or be integrated in it.

The computer in the control unit 1 interacts, as already stated, with the sensor 7, which measures the current parallel and angular offset of the mutually coupled shafts W1 and W2 whose alignment state is to be checked, and if necessary, to be corrected, at a number of different angular positions, and supplies corresponding electrical measurement signals to the computer in the control unit 1.

The measurement signals supplied by the sensor unit 7 and further data entered in the computer, possibly via a keypad 1b on the control unit 1, in particular the relative position of the feet 6 of the machine M1 with respect to one another and with respect to the position of the feet 6 of the machine M2, that is to say with respect to previously known reference points on the base, are used by the computer to calculate correction values continuously which indicate in which direction and by what amount the machine feet 6 of the machine M1 still have to be moved with respect to their current position in order to align the rotation axes of the shafts W1 and W2 accurately.

The data corresponding to the calculated correction values are entered by the computer in the announcement unit 2. The latter has a microprocessor unit MPU and a voice synthesizer or voice synthesis unit VSU connected to said microprocessor unit MPU and controlled by it. This voice synthesis unit VSU has connected to it a decoder and a plurality of which can be called up ROMs controlled by it, and the voice synthesis unit VSU supplies to an analog output DAO a selected voice sequence as an analog electrical signal via a low-pass filter LPF and an amplifier AMP to a loudspeaker and/or to the earpiece 5 worn by the machine alignment technician 4.

The microprocessor unit MPU may select a plurality of different, suitably designed voice sequences from the voice synthesis unit VSU, to be precise depending on the correction data which, in the exemplary embodiment, are supplied to it via an RS 232 interface from the computer located in the control unit 1. The data interchange between the MPU and VSU takes place via a data line which is routed to the data connections $I_0$–$I_7$ of the voice synthesis unit VSU, and the voice synthesis unit VSU is controlled in a suitable manner by the microprocessor unit MPU at the inputs WR (Write), RD (Read), CS (Chip Select) and RESET.

The required voice sequences are stored digitally in one or more ROMs whose memory areas can be called up from connections $A_0$–$A_{15}$ of the voice synthesis unit VSU via digital address lines which lead to connections $A_0$–$A_{15}$ of the ROMs, it being possible to activate the individual ROMs selectively by means of the decoder connected to selection connections $A_{16}$ and $A_{17}$, in order to output the voice sequences that have been called up. The digitally coded voice sequences that have been called up pass via a data line which is connected to the data outputs $O_0$–$O_7$ of the ROMs and leads to the data inputs $D_0$–$D_7$ of the voice synthesis unit VSU into said inputs and are converted by means of the digital/analog converter device fitted therein into the analog, electrical voice signal which is output at the output DAO.

In the same manner and on the basis of other data stored digitally in ROMs, voice sequences used for operator guidance can also be output at the VSU output DAO controlled by the computer in the control unit 1 and the microprocessor unit MPU, this being advantageous, in particular, if the operator instructions relating to this for some reason cannot be displayed, or cannot be displayed sufficiently clearly, on the display 1a of the control unit 1.

If the computer (main processor) is sufficiently powerful, it can also carry out the function of the microprocessor unit MPU, so that the latter may then be omitted from the announcement unit 2.

What is claimed is:

1. A method for alignment of a shaft (W1) of a rotating machine (M1), which is supported at predetermined mounting points (6) on a base, in a predetermined three-dimensional nominal position by moving the machine (M1) on the base, comprising:
   (a) detecting an instantaneous position of the shaft (W1) with respect to the nominal position by sensor device means providing electrical position signals corresponding to the difference between the instantaneous position of the shaft (W1) and the shaft nominal position,
   (b) calculating by means of a computer (main computer or alignment computer) correction values for position corrections to be made at each of the individual mounting points using the position signals, the know position of the mounting points (6) with respect to the predetermined reference points on the base and other geometric machine data and/or geometric measurement data related to the base in order to achieve the shaft nominal position, and
   (c) providing an alignment technician who will make the position correction with the magnitude and direction of the correction value for each mounting point (6),
   wherein the current correction values for the individual mounting point (6) are transmitted to the alignment technician (4) acoustically.

2. The method as claimed in claim 1, wherein instructions from computer-controlled operator guidance, in particular for operation of the computer, and for handling of the sensor device (7), are also transmitted to the alignment technician (4) acoustically.

3. The method as claimed in claim 1, wherein the computer is integrated in the sensor device (7).

4. The method as claimed in claim 1, wherein the correction values are in each case transmitted in the form of a coded tone.

5. The method as claimed in claim 4, wherein the frequency of the tone corresponds to the magnitude of the correction to be made in a predetermined direction at a predetermined mounting point (6).

6. The method as claimed in claim 5, wherein, in addition to the tone at a variable frequency corresponding to the correction values, a tone at the frequency corresponding to the correction value zero is permanently transmitted.

7. The method as claimed in claim 4, wherein the tone is pulsed, the duty ratio and/or the pulse frequency corresponding to the magnitude of the correction to be made in a predetermined direction at a predetermined mounting point (6).

8. The method as claimed in claim 1, wherein the magnitude and direction of the individual correction values are stated continuously to the alignment technician (4) together with the identification of the relevant mounting point (6) and, if required, with instructions for operator guidance with the aid of voice memory module or an announcement device (2) having a voice synthesis unit (VSU).

9. The method as claimed in claim 1, wherein the correction values are transmitted acoustically via a loud speaker or earpiece (5).

10. The method as claimed in claim 9, wherein a tone or voice information is transmitted without wires via a radio link or IR link to the loudspeaker or earpiece (5).

11. The method as claimed in claim 1, wherein the calculated correction values are also indicated visually on a display (1A).

12. An apparatus, comprising:
   (a) a sensor device (7), which can be mounted on a shaft (W1) to be aligned, for detecting an instantaneous position of the shaft (W1) with respect to a nominal position, the sensor device (7) providing electrical position signals corresponding to the difference between the instantaneous shaft position and the shaft nominal position,
   (b) an electronic computer which uses the electrical position signals supplied to it by the sensor device (7) and geometric measurement data which are entered in it and are characteristic, inter alia, of the position of the mounting points (6) of a machine (M1) with respect to reference points on the base to calculate correction values for the position corrections to be made in each case at the individual mounting points (6) of the machine (M1) in order to achieve the shaft nominal position, and
   (c) a device which informs an alignment technician (4) carrying out the position corrections of the magnitude and direction of the calculated correction values for each mounting point (6), distinguished by a device (2) which is controlled by the computer for producing acoustic signals which are characteristic at least of the magnitude of the calculated correction values.

13. The apparatus as claimed in claim 12, wherein the computer and the device (2) for producing the acoustic signals are integrated in a separate control unit (1), or are fitted to it.

14. The apparatus as claimed in claim 12, wherein the computer and the device (2) for producing the acoustic signals are integrated in the sensor device (7).

15. The apparatus as claimed in claim 12, distinguished by a tone generator which is controlled by the computer and is connected directly or via a radio link or IR link, without wires, to at least one loud speaker and/or earpiece (5).

16. The apparatus as claimed in claim 12, distinguished by a voice memory module which is controlled by the computer and is connected directly or via a radio link or IR link, without wires, to at least one loud speaker and/or earpiece.

17. The apparatus as claimed in claim 12, distinguished by an announcement unit (2) which is controlled by the computer, is connected directly or via a radio link or IR link, without wires, to at least one loud speaker and/or earpiece (5) and has a voice synthesis unit (VSU).

18. The apparatus as claimed in claim 12, distinguished by a computer-control display (1A) for indicating, with respect to the mounting points, the correction values calculated by the computer.

* * * * *